(12) United States Patent
Hung et al.

(10) Patent No.: US 7,171,062 B2
(45) Date of Patent: Jan. 30, 2007

(54) FINGERPRINT IDENTIFICATION APPARATUS

(75) Inventors: Kwell Hung, Taipei (TW); Joseph Su, Hsi Chih (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 11/246,078

(22) Filed: Oct. 11, 2005

(65) Prior Publication Data

US 2006/0078179 A1    Apr. 13, 2006

Related U.S. Application Data

(62) Division of application No. 09/866,612, filed on May 30, 2001, now abandoned.

(51) Int. Cl.
  *G06K 9/20* (2006.01)
  *G06K 9/00* (2006.01)

(52) U.S. Cl. ........................ 382/312; 382/124

(58) Field of Classification Search ........ 382/124–127, 382/312

See application file for complete search history.

(56) References Cited

U.S. PATENT DOCUMENTS

| | | | | |
|---|---|---|---|---|
| 3,619,060 A | * | 11/1971 | Johnson | 356/71 |
| 5,177,802 A | * | 1/1993 | Fujimoto et al. | 382/124 |
| 5,942,761 A | * | 8/1999 | Tuli | 250/556 |
| 6,178,255 B1 | * | 1/2001 | Scott et al. | 382/124 |
| 6,259,108 B1 | * | 7/2001 | Antonelli et al. | 250/556 |
| 6,260,885 B1 | * | 7/2001 | Massimo, Sr. | 283/68 |
| 6,504,945 B1 | * | 1/2003 | Helot et al. | 382/126 |
| 6,856,695 B1 | * | 2/2005 | Nakamura et al. | 382/124 |
| 6,912,299 B1 | * | 6/2005 | Hoshino | 382/124 |
| 2002/0172402 A1 | * | 11/2002 | O'Gorman et al. | 382/126 |

FOREIGN PATENT DOCUMENTS

| | | | | |
|---|---|---|---|---|
| JP | | 04088586 | * | 3/1992 |
| JP | | 04125780 A | * | 4/1992 |

* cited by examiner

*Primary Examiner*—Vikkram Bali
*Assistant Examiner*—Colin LaRose
(74) *Attorney, Agent, or Firm*—Rosenberg, Klein & Lee

(57) ABSTRACT

A fingerprint identification apparatus comprises a contact image sensor (CIS) module, a keyswitch and a restoring unit. The keyswitch has a transparent plate for finger-tactility. The user put his finger on the transparent plate to move the transparent plate such that the keyswitch has relative movement with respect to the CIS module and the CIS module scans the fingerprint of user for fingerprint identification. The restoring unit is arranged on the keyswitch and provides restoring force to the keyswitch.

6 Claims, 4 Drawing Sheets

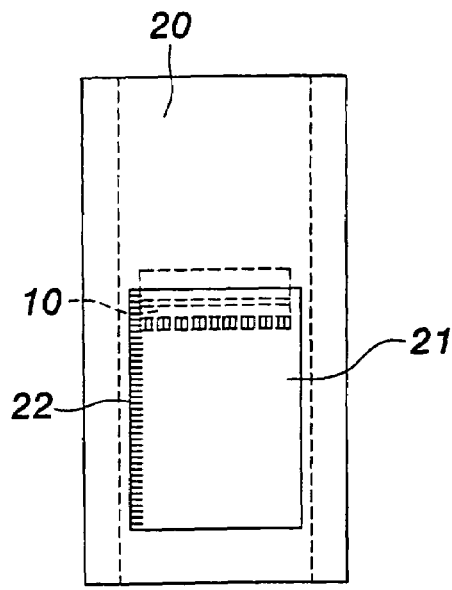
FIG. 7
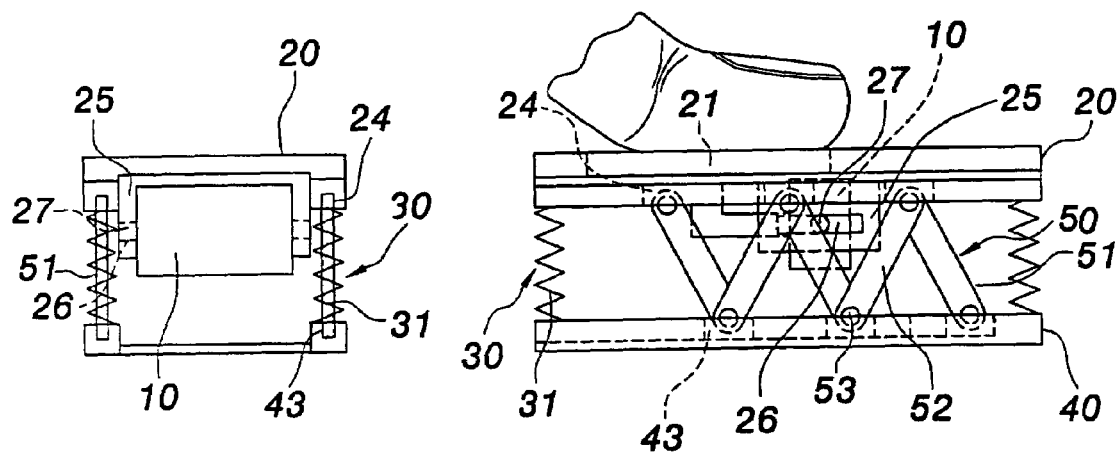
FIG. 5
FIG. 6

FINGERPRINT IDENTIFICATION APPARATUS

CROSS REFERENCE TO RELATED APPLICATION

This application is a divisional application of U.S. application Ser. No. 09/866,612, filed on May 30, 2001 now abandoned.

BACKGROUND OF THE INVENTION

1. Field of the Invention

The present invention relates to a fingerprint identification apparatus, especially to a fingerprint identification apparatus applicable to information product to enhance security and provide authentication function.

2. Description of the Related Art

The prior art fingerprint identification apparatus is used for authentication and security function. As shown in FIG. 1, the prior art fingerprint identification apparatus is generally composed of an area CCD (charge coupled device) sensor 10a, a light source 11a, a reflection mirror 12a, a lens 13a and a finger-tactility transparent plate 14. When the light from the light source 11a is impinged to a finger touching the transparent plate 14, the light reflected from the finger is focused by the lens 13a, reflected by the reflection mirror 12a and then detected by the area CCD sensor 10a.

However, in above-mentioned fingerprint identification apparatus using area CCD sensor, the price of the area CCD sensor is high (about 20 USD) and the optical system composed of light source, reflection mirror, and lens is complicated and hard to maintain. Moreover, the above-mentioned fingerprint identification apparatus using area CCD sensor consumes more power and occupies larger space.

SUMMARY OF THE INVENTION

It is the object of the present invention to provide a fingerprint identification apparatus, which uses cheaper CIS detector to reduce cost and volume.

To achieve above object, the present invention provides a fingerprint identification apparatus comprises a contact image sensor (CIS) module, a keyswitch and a restoring unit. The keyswitch has a transparent plate for finger-tactility. The user put his finger on the transparent plate to move the transparent plate such that the keyswitch has relative movement with respect to the CIS module; and the CIS module scans the fingerprint of user for fingerprint identification. The restoring unit is arranged on the keyswitch and provides restoring force to the keyswitch.

The various objects and advantages of the present invention will be more readily understood from the following detailed description when read in conjunction with the appended drawing, in which:

BRIEF DESCRIPTION OF THE DRAWINGS

FIG. 5 shows the front view of the second preferred embodiment of the present invention;

FIG. 6 shows the sectional view of the second preferred embodiment of the present invention;

FIG. 7 shows the top view of the second preferred embodiment of the present invention;

DETAILED DESCRIPTION OF THE PREFERRED EMBODIMENTS

Figure 1:
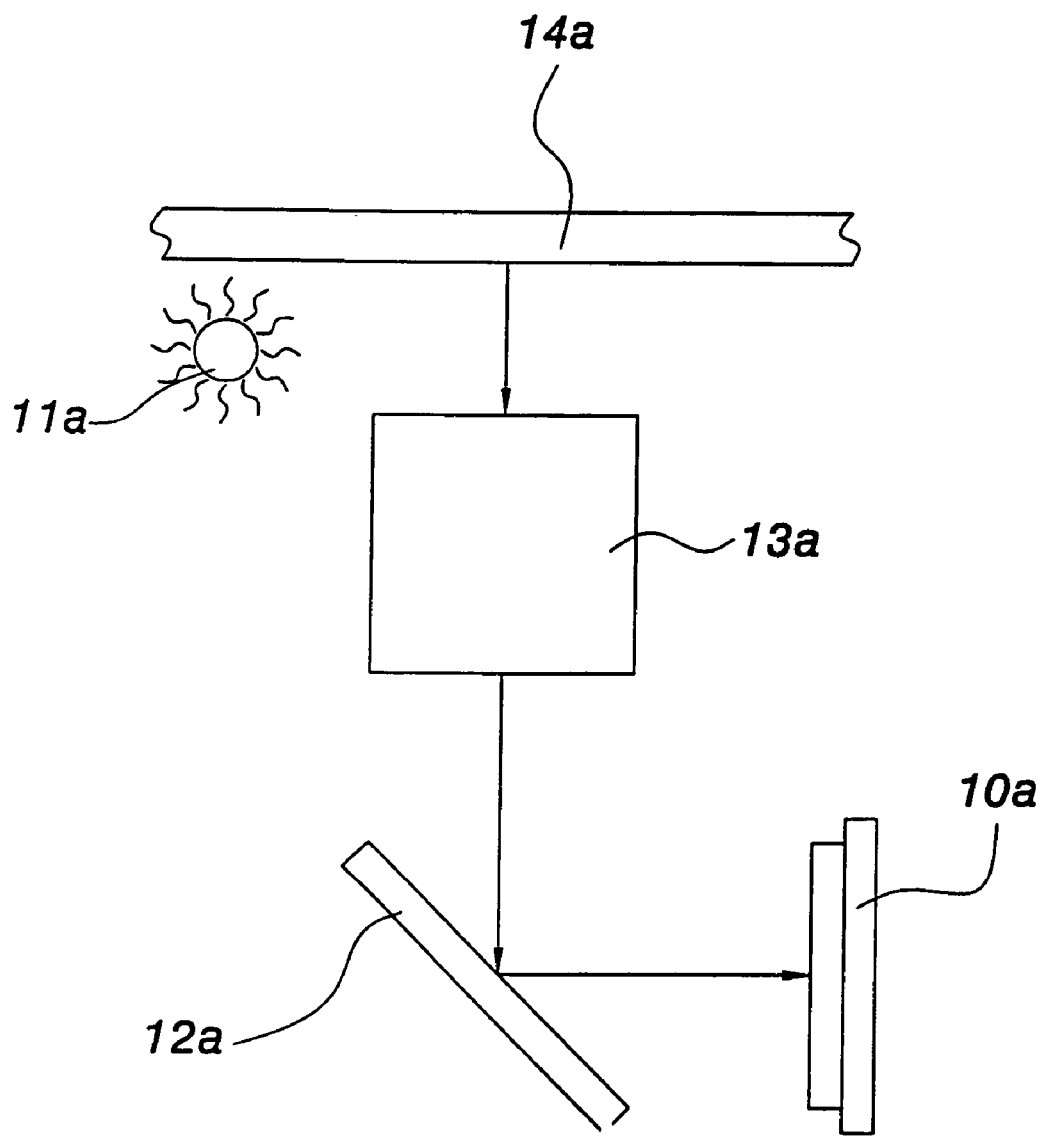
FIG. 1 shows the schematic view of the prior art fingerprint identification apparatus.
Figure 4:
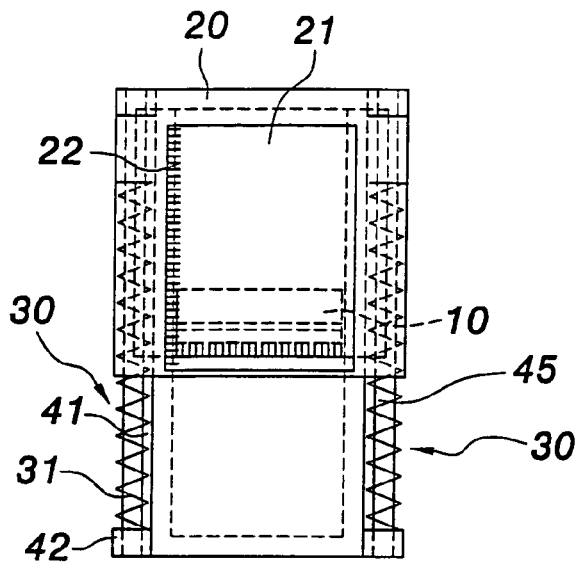
FIG. 4 shows the top view of the first preferred embodiment of the present invention.
Figure 2:
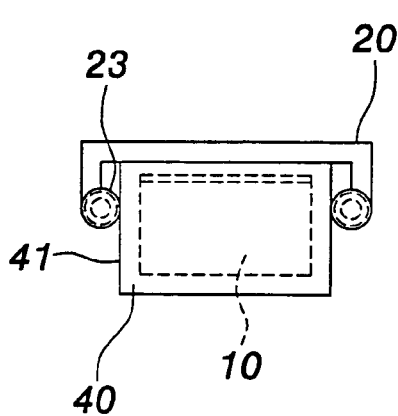
FIG. 2 shows the front view of the first preferred embodiment of the present invention.
Figure 3:
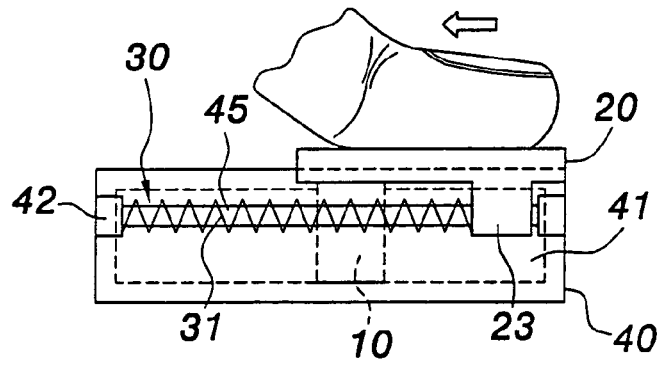
FIG. 3 shows the sectional view of the first preferred embodiment of the present invention.

FIGS. 2, 3 and 4 show the first preferred embodiment of the present invention. The present invention provides a fingerprint identification apparatus applicable to information product to enhance security and provide authentication function. As shown in those figures, the inventive fingerprint identification apparatus comprises a CIS (contact image sensor) module 10, a keyswitch 20 and a restoring means 30. The CIS module 10 is fixedly arranged, for example, arranged on a base 40. In the first preferred embodiment of the present invention, the base 40 is of rectangular shape. However, the shape of the base 40 is not limited to rectangular shape. The base 40 can be fixed on, for example, a keyboard and has two sliding surfaces 41 on both lateral surfaces thereof. Moreover, the base 40 has two spring-fixing parts 42 on front end of the two lateral surfaces thereof.

In the first preferred embodiment of the present invention, the keyswitch 20 is a cap-shaped body and can be wholly or partially transparent. As shown in those figures, the keyswitch 20 in the first preferred embodiment of the present invention has a transparent plate 21 for finger-tactility. The transparent plate 21 is in contact with the CIS module 10 and has a scale ruler 22 on one side thereof to measure fingerprint size. The keyswitch 20 is slidably fit on the base 40 and has two cylindrical sliding parts 23 extended downward from both lateral walls thereof. The inner sides of the two cylindrical sliding parts 23 are slidably fit on the two sliding surfaces 41 of the base 40. The keyswitch 20 is slidably fit on the base 40 and can have forward and backward movement such that the keyswitch 20 has relative movement with respect to the CIS module 10 in order to facilitate the scanning of the CIS module 10 to the fingerprint. Moreover, the base 40 has two guiding shafts 45 on both sides thereof and the two cylindrical sliding parts 23 are slidably fit on the two guiding shafts 45. By the two guiding shafts 45, the keyswitch 20 has smooth sliding motion.

The restoring means 30 is composed of two springs 31 arranged on both sides of the base 40. On end of the spring 31 is connected to the spring-fixing part 42 and another end of the spring 31 is connected to the cylindrical sliding part 23 extended downward from both lateral walls of the keyswitch 20. The spring 31 provides restoring force to the keyswitch 20. Moreover, the spring 31 can be replaced by resilient element such as rubber to provide restoring force to the keyswitch 20.

As shown in FIG. 3, the fingerprint identification apparatus according to the present invention can be used in the image acquisition of fingerprint. The user puts his finger on the transparent plate 21 of the keyswitch 20 and horizontally moves the keyswitch 20 by his finger. Therefore, the fingerprint has relative movement with respect to the CIS module 10 and the CIS module 10 scans the image of the fingerprint. The keyswitch 20 is restored to original position by the springs 31 after the finger leaves the transparent plate 21 of the keyswitch 20.

FIGS. 5, 6 and 7 show the second preferred embodiment of the present invention. As shown in those figures, the inventive fingerprint identification apparatus comprises a CIS (contact image sensor) module 10, a keyswitch 20, a restoring means 30, and a link means 50. The CIS module 10 is movably arranged, for example, arranged atop a base 40.

The link means 50 is provided between the keyswitch 20 and the base 40 and is composed of two link rod sets 51, wherein each link rod set 51 has a plurality of link rods 52 pivotally connected by pivotal shafts 53. The base 40 has two lower guiding grooves 43 on top lateral sides thereof; and the bottom portions of the link rod sets 51 are received within the lower guiding grooves 43. One end of each link rod set 51 is connected to the base 40; another end of each link rod set 51 is a free end. Therefore, the two link rod sets 51 are expanded and retracted within the two lower guiding grooves 43. The CIS module 10 is connected to the two link rod sets 51 such that the CIS module 10 is linked by the two link rod sets 51 and moved in horizontal direction as the two link rod sets 51 are expanded and retracted within the two lower guiding grooves 43.

The keyswitch 20 is movably arranged on the base 40 and has two upper guiding grooves 24 on two top lateral sides thereof. The top portions of the link rod sets 51 are received within the two upper guiding grooves 24. The keyswitch 20 is movably arranged on the base 40 and has vertical movement. The keyswitch 20 has a guiding stage 25 on bottom thereof and the CIS module 10 is slidably fit within the guiding stage 25. The guiding stage 25 has two horizontal guiding grooves 26 on both sides thereof and extending along horizontal direction. The CIS module 10 has two guiding rods 27 on both sides thereof and corresponding to the two horizontal guiding grooves 26. The two guiding rods 27 are slidably fit within the two horizontal guiding grooves 26. The CIS module 10 is guided by the two horizontal guiding grooves 26 to have horizontal motion when the two link rod sets 51 are expanded and retracted within the two lower guiding grooves 43.

The restoring means 30 is composed of four springs 31 arranged on four corners between the base 40 and the keyswitch 20. The springs 31 provide restoring force to the keyswitch 20.

As shown in FIG. 6, the fingerprint identification apparatus according to the present invention can be used in the image acquisition of fingerprint. The user puts his fingerprint on the transparent plate 21 of the keyswitch 20 and presses down the keyswitch 20 in vertical direction by his finger. Afterward, the link means 50 moves the CIS module 10 in horizontal direction. Therefore, the fingerprint has relative movement with respect to the CIS module 10 and the CIS module 10 scans the image of the fingerprint. The keyswitch 20 is restored to original position by the springs 31 after the finger leaves the transparent plate 21 of the keyswitch 20.

Figure 10:
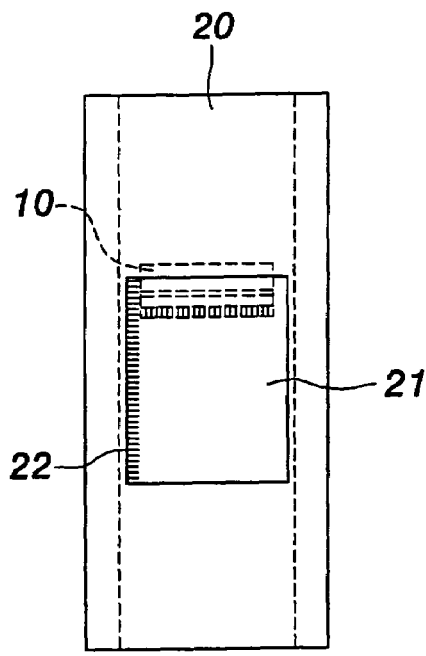
FIG. 10 shows the top view of the third preferred embodiment of the present invention.
Figure 8:
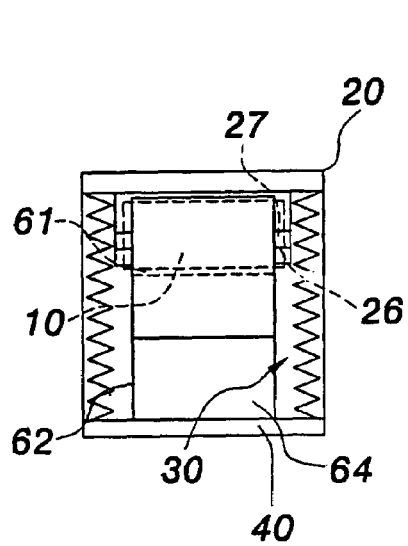
FIG. 8 shows the front view of the third preferred embodiment of the present invention.
Figure 9:
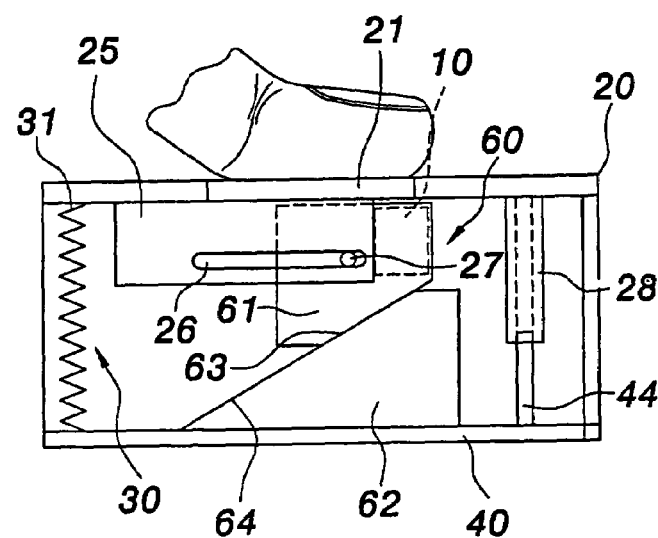
FIG. 9 shows the sectional view of the third preferred embodiment of the present invention.

FIGS. 8, 9 and 10 show the third preferred embodiment of the present invention. As shown in those figures, the inventive fingerprint identification apparatus comprises a CIS (contact image sensor) module 10, a keyswitch 20, a restoring means 30, and a link means 60. The CIS module 10 is movably arranged, for example, arranged atop a base 40.

The link means 60 is provided between the keyswitch 20 and the base 40 and is composed of an upper wedge 61 and a lower wedge 62. The upper wedge 61 is movably placed below the keyswitch 20 and the lower wedge 62 is fixedly arranged on the base 40. The upper wedge 61 has a first bevel 63 and the lower wedge 62 has a second bevel 64, wherein the first bevel 63 is in contact with the second bevel 64. The CIS module 10 is arranged on the upper wedge 61. When the upper wedge 61 is pushed in vertical movement, the CIS module 10 has horizontal movement due to the contacting of the first bevel 63 and the second bevel 64.

The keyswitch 20 is movably arranged on the base 40 and has vertical movement. The keyswitch 20 has a guiding stage 25 on bottom thereof and the upper wedge 61 of the CIS module 10 is slidably fit within the guiding stage 25. The guiding stage 25 has two horizontal guiding grooves 26 on both sides thereof and extending along horizontal direction. The upper wedge 61 of the CIS module 10 has two guiding rods 27 on both sides thereof and corresponding to the two horizontal guiding grooves 26. The two guiding rods 27 are slidably fit within the two horizontal guiding grooves 26 such that the upper wedge 61 and the CIS module 10 have horizontal motion.

The restoring means 30 is composed of at least one spring 31 arranged between the base 40 and the keyswitch 20. The springs 31 provide restoring force to the keyswitch 20. Moreover, a guiding stage 28 and a guiding rod 44 are provided between the base 40 and the keyswitch 20, wherein the guiding stage 28 is arranged on the keyswitch 20 and the guiding rod 44 is arranged on the base 40. The guiding rod 44 is slidably fit into the guiding stage 28 to guide the vertical motion of the keyswitch 20.

As shown in FIG. 9, the fingerprint identification apparatus according to the present invention can be used in the image acquisition of fingerprint. The user puts his fingerprint on the transparent plate 21 of the keyswitch 20 and presses down the keyswitch 20 in vertical direction by his finger. Afterward, the link means 60 moves the CIS module 10 in horizontal direction. Therefore, the fingerprint has relative movement with respect to the CIS module 10 and the CIS module 10 scans the image of the fingerprint. The keyswitch 20 is restored to original position by the springs 31 after the finger leaves the transparent plate 21 of the keyswitch 20.

The fingerprint identification apparatus according to the present invention adopts cheap CIS module 10 (about 10 USD) and uses keyswitch 20 and restoring means 30 to provide fingerprint scanning. The cost and volume of the fingerprint identification apparatus is greatly reduced.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:
1. A fingerprint identification apparatus, comprising:
    a contact image sensor (CIS) module movably arranged on a base having two upper guiding grooves and two lower guiding grooves formed therein;
    a keyswitch having a transparent plate for finger-tactility, and the keyswitch having relative movement with respect to the CIS module;
    a restoring means composed of four springs arranged on four corners between the base and the keyswitch for providing a restoring force to the keyswitch; and
    a link means composed of at least two link rod sets provided between the keyswitch and the base, and each of the link rod sets having a plurality of link rods pivotally connected to one another by pivotal shafts, wherein bottom portions of the link rod sets are received within the lower guiding grooves and top portions of the link rod sets are received within the upper guiding grooves for expanding or retracting the link rods.

2. The fingerprint identification apparatus as in claim 1, wherein the keyswitch has a guiding stage on a bottom thereof, and the CIS module is slidably fit within the guiding stage.

3. The fingerprint identification apparatus as in claim 2, wherein the guiding stage has two horizontal guiding grooves on both sides thereof, and the CIS module has two guiding rods on both sides thereof for sliding to the two horizontal guiding grooves.

4. The fingerprint identification apparatus as in claim 1, wherein the keyswitch is wholly composed of the transparent plate or partially composed of the transparent plate.

5. The fingerprint identification apparatus as in claim 1, wherein the transparent plate further has a scale ruler to measure the fingerprint size.

6. The fingerprint identification apparatus as in claim 1, wherein the restoring means is made of resilient element.

* * * * *